United States Patent

Hamilton, III

[15] 3,684,064
[45] Aug. 15, 1972

[54] LOCK-UP DEVICE FOR COUPLING OR CONVERTER

[72] Inventor: Stoddard C. Hamilton, III, Highland, Mich.

[73] Assignee: General Motors Corporation, Detroit, Mich.

[22] Filed: Oct. 23, 1970

[21] Appl. No.: 83,361

[52] U.S. Cl. ............... 192/3.31, 192/105 B, 192/67, 192/89
[51] Int. Cl. ............................................. F16h 41/18
[58] Field of Search...192/3.28, 3.31, 105 B, 105 CS, 192/105 CP

[56] References Cited

UNITED STATES PATENTS

| 2,106,423 | 1/1938 | Lavaud | 192/3.31 |
| 2,168,863 | 8/1939 | Lavaud | 192/3.28 X |
| 2,267,334 | 12/1941 | Keller | 192/3.31 |
| 2,584,032 | 1/1952 | Lapsley | 192/3.31 X |
| 3,059,740 | 10/1962 | Roche | 192/3.28 |

FOREIGN PATENTS OR APPLICATIONS

| 718,263 | 11/1954 | Great Britain | 192/3.31 |

*Primary Examiner*—Benjamin W. Wyche
*Attorney*—W. E. Finken, A. M. Heiter and Charles R. White

[57] ABSTRACT

Hydrodynamic unit having a lock-up device to prevent slip of the rotors subsequent to the attainment of a predetermined input speed. In one form of the invention camming balls are moved outwardly on special ramps in response to rotary drive of the input by centrifugal force of predetermined magnitude to effect the drive engagement of an input driven locking plate and a turbine member. The locking plate is moved from drive engagement with the turbine member by spring means when the magnitude of the centrifugal force developed by the balls is reduced to a predetermined value for torque transmittal through the hydraulic unit. In another form of the invention a centrifugally operated valve closes off an oil exit port of a hydraulic pump operatively disposed between the input and output of the converter or coupling at predetermined input speeds to hydraulically lock the pump and lock-up the hydrodynamic unit. As the magnitude of the centrifugal force developed by the valve diminishes to a predetermined value, spring means moves the valve to open the discharge port so that the pump pumps fluid therethrough allowing the hydraulic operation of the hydrodynamic unit.

4 Claims, 6 Drawing Figures

PATENTED AUG 15 1972

INVENTOR.
Stoddard C. Hamilton III
BY
Charles R. White
ATTORNEY

INVENTOR.
Stoddard C. Hamilton II
BY
Charles R. White
ATTORNEY

LOCK-UP DEVICE FOR COUPLING OR CONVERTER

This invention relates to torque transmitting hydrodynamic units and more particularly to centrifugally actuated lock-up devices for torque-transmitting couplings and converters.

Fluid couplings and hydrodynamic torque converters have been extensively used in power transmissions for vehicles to provide for the smooth application of engine power to the drive wheels, to provide slippage to prevent shock loads from being transmitted into the engine and to prevent engine lugging at low vehicle speed. The torque converter further provides for torque multiplication to improve vehicle performance. Slippage of the fluid unit, although providing important benefits, detracts from the efficiency of the transmission. To improve efficiency, lock-up clutches have been employed to prevent slippage of the fluid unit during steady state driving. While many such devices have been proposed their use has been limited since they generally involve costly and complex mechanisms and controls. Some of these prior devices produced high inertia effects and also employed special friction facings on the clutch surfaces which added contaminants to the converter oil.

This invention is drawn to new and improved locking devices for couplings and converters preferably which automatically engage at the coupling stage of operation to prevent rotor slippage and thereby improve operating efficiencies. In a first embodiment of this invention there is a base plate and a locking plate operatively disposed in a fluid unit which are yieldably held together by spring devices with camming balls disposed therebetween. The base plate is secured to an interior wall of a rotary input member of the unit. As input speeds increase, the magnitude of centrifugal force developed by the camming balls forces them radially outwardly on special inclined cam ramps to effect the axial separation of the two plates; this forces the locking plate into drive engagement with a turbine hub member thereby locking the input to the turbine. As input speeds diminish, the force of the spring devices moves the camming balls radially inward on the camming ramps and moves the locking plate from drive engagement with the turbine hub so that the fluid unit transmits torque.

In a second embodiment of the invention a hydraulic pump is disposed within the hydraulic unit between the front plate and turbine hub so that it turns with the relative motion between the turbine and the front cover. At a predetermined input speed a valve is centrifugally actuated to close the oil exit port for the pump so that the pump is hydraulically locked, causing the turbine and cover to rotate as a unit. Below this predetermined speed a spring device moves the valve to a position in which the oil exit port is uncovered so that the hydraulic pump can pump fluid and allow the fluid unit to transmit input torque.

Both embodiments feature small, compact locking units which automatically respond to changing operating conditions of the coupling or converter to appropriately provide for lock-up or hydraulic torque transmission. Inertia effects are minimal with this invention since the components are close to the rotational axis of the hydrodynamic unit. The controls for the units are straight forward, highly reliable and employ a minimal number of components. Positive locking of the converter or coupling is provided with this invention using standard construction such as a gear type hydraulic pump or the connectors joining the turbine to the turbine hub as locking teeth. This invention eliminates the need for special friction material used on most lock-up devices and thereby eliminates the possible contamination of the hydraulic fluid of the hydrodynamic unit by the friction material.

These and other features, objects and advantages of the invention will become more apparent from the following detailed description in which.

Figure 1:
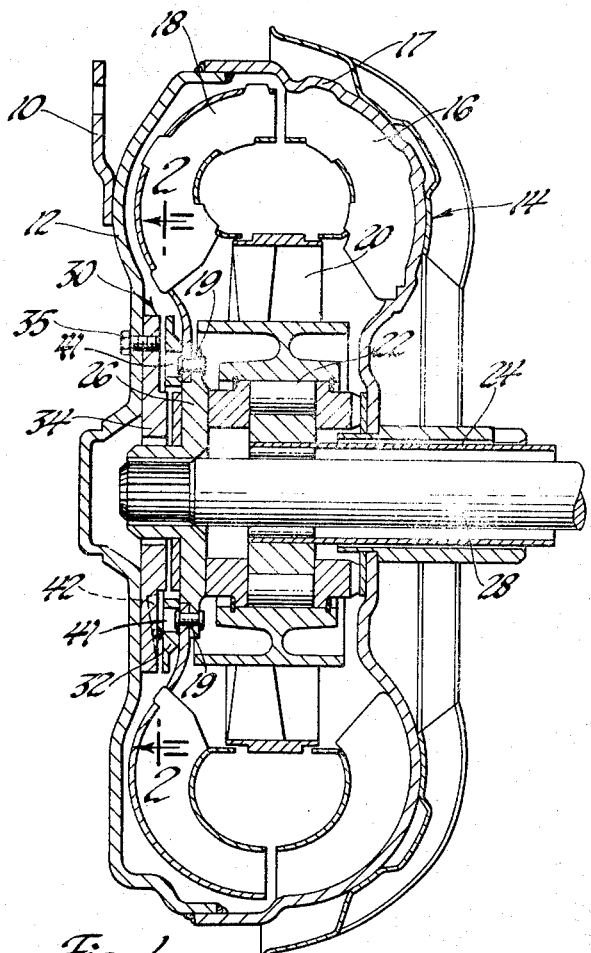
FIG. 1 is a side sectional view of a torque converter.

As shown in FIG. 1 there is an input lug 10 which is drivingly connected to the front cover 12 of a hydrodynamic torque converter 14. The torque converter has a bladed pump 16 operatively connected to the converter housing 17 driven through front cover 12, a bladed turbine 18, and a bladed stator 20. These bladed elements provide a torus for the circulation of transmission fluid during converter operation. The stator is connected by a one-way brake 22 to a ground sleeve 24. The turbine 18 is drivingly connected by rivets 19 to an annular flange portion of a drive hub 26 which is splined to a drive shaft 28.

This converter has a lock-up clutch 30 disposed adjacent to front cover 12 and radially inwardly of the bladed part of the turbine. The clutch comprises an annular locking plate 32 disposed adjacent to the hub 26, a base plate 34 rigidly secured to the front cover of the torque converter by bolts 35, ball members 36 disposed between the base plate and the locking plate, coil springs 38 for yieldably connecting the base plate and the locking plate, and connector pins 40 which extend between the base plate and the locking plate to connect these two plates for rotation together.

Figure 3:
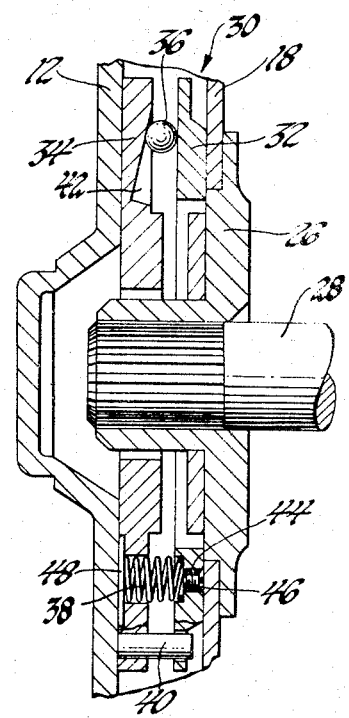
FIG. 3 is a view taken along lines 3—3 of FIG. 2.
Figure 2:
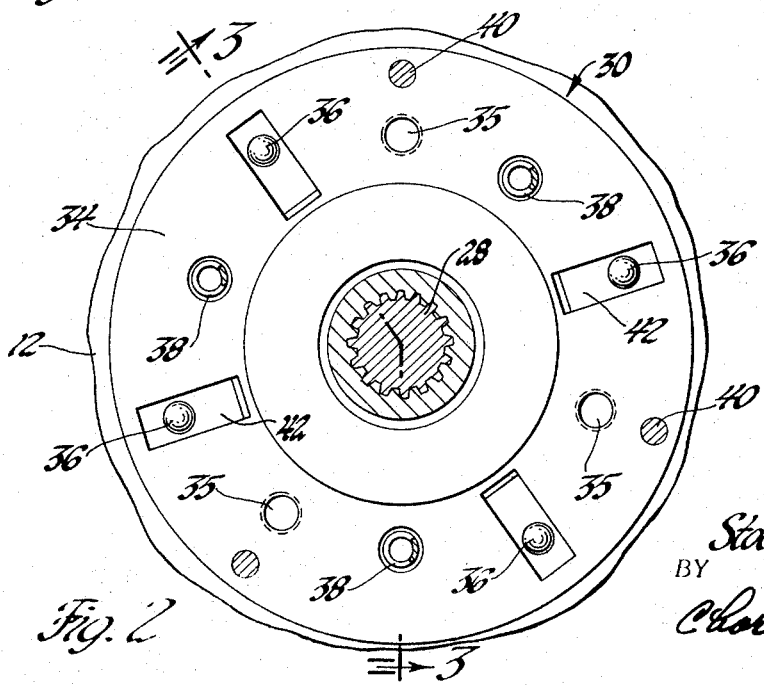
FIG. 2 is a view taken generally along lines 2—2 of FIG. 1.

As best shown in FIGS. 2 and 3 the balls 36 are disposed in radially disposed ramps 42; the depth of these ramps decrease as they extend outwardly. These balls are used to move the locking plate axially so that openings 41 formed in the locking plate can drivingly engage the heads of the rivets 19 connecting the turbine to the hub 26. This occurs as the balls move up the ramps when the pump is driven to a predetermined speed and the magnitude of the centrifugal force is developed by the revolving balls overcomes the opposing forces urging the balls inwardly.

Each spring 38 has a small end 44 which projects into the locking plate and receives a screw 46 to secure the spring to the locking plate. The other end of the spring has a large coil 48 disposed in a recess in the forward side of the base plate to secure the spring thereto. FIG. 2 shows in this embodiment four ball ramp devices and three springs.

In operation, when the input speeds are sufficiently high, the centrifugal force developed by the balls will cause them to move outwardly on the ramps. The outward movement on the balls forces the locking plate 32 axially toward the turbine flange. When the openings 41 in the locking plate drivingly engage the heads of the rivets 19, the converter pump and turbine will be locked for rotation as a unit. This eliminates converter slip during coupling and therefore improves converter slip operating efficiency. When the speed of the input and the connected pump and turbine drops to a predetermined speed the springs retract the locking plate from the rivets 19 to force the balls inwardly on the inclined ramps 42 so that the lock up clutch disengages and the converter operates as a conventional hydraulic torque transmitting unit.

Figure 4:
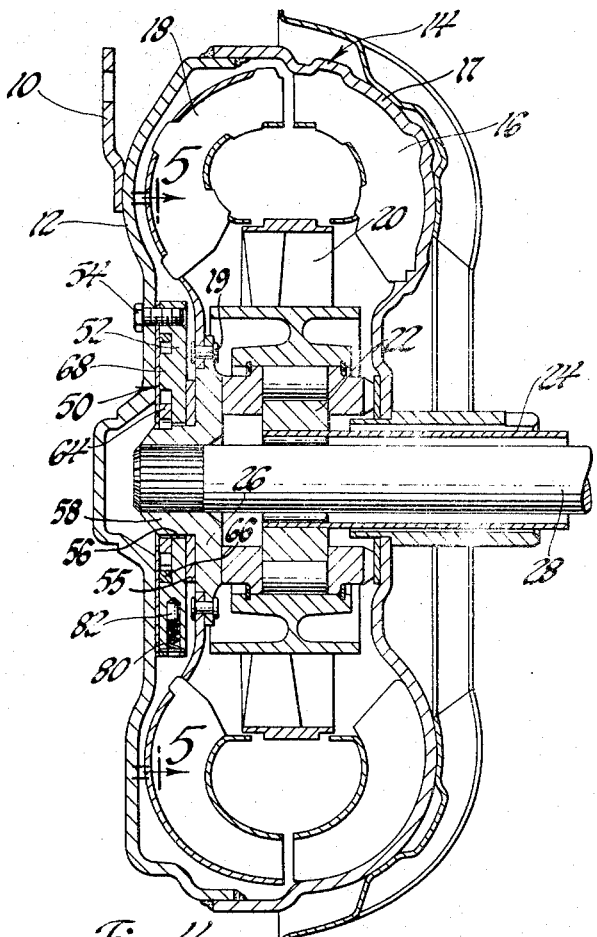
FIG. 4 is a side sectional view of a torque converter illustrating a second embodiment of the invention.
Figure 6:
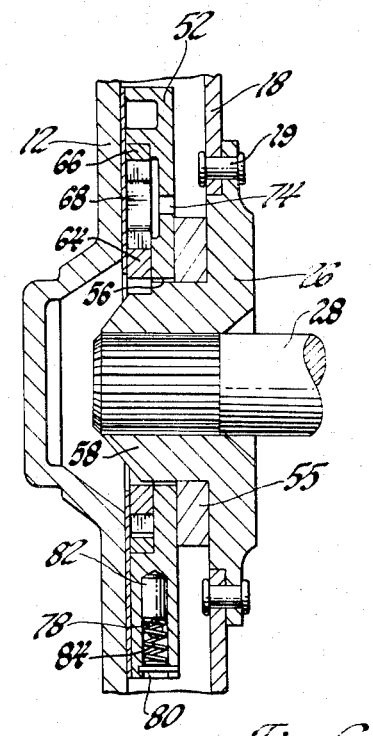
FIG. 6 is a view taken along lines 6—6 of FIG. 5.
Figure 5:
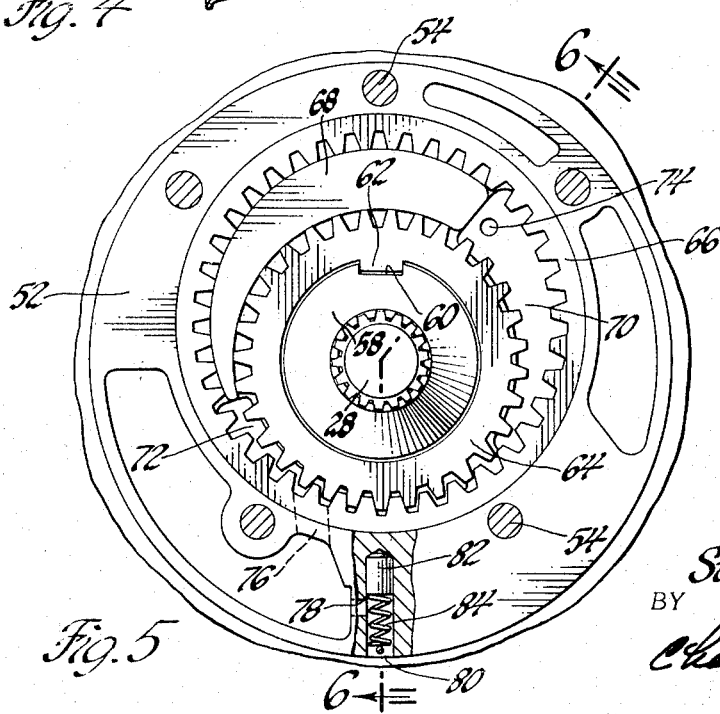
FIG. 5 is a view taken generally along lines 5—5 of FIG. 4.

A second embodiment of the invention is illustrated in FIGS. 4–6. Corresponding parts of the two embodiments are identified by the same reference numerals. In this embodiment there is a hydraulic pump 50 operatively connected between the front cover 12 and the turbine hub 26. The pump has a body 52 secured to the inside of the front cover 12 of the converter 14 by bolts 54. A thrust plate 55 is disposed between the pump body 52 and hub 26. The pump body has an inner annular opening 56 which receives the axial extension 58 of the turbine hub 26 that has a keyway 60 which receives key 62 extending radially inwardly from a pump drive gear 64. This gear meshes with an internal gear 66 as shown best in FIG. 5. A crescent seal 68 formed on the pump body separates inlet port area 70 and outlet port area 72. The inlet port area is fed with converter oil through an inlet passage 74 and is pumped from the outlet port area through passage 76 and then through a passage 78 connected to a radially disposed exhaust bore 80 which is connected to a sump not shown. A valve 82 is mounted for sliding movement in exhaust bore 80 and is urged to a stored position by spring 84 so that passage 78 is open to exhaust through the bore 80. Preferably in all converter operating conditions except coupling, the pump 50 pumps converter oil from inlet passage 74 to exhaust bore 80.

As input speeds increase the rotary speed of the pump body correspondingly increases and the resulting centrifugal force developed by the valve element 82 increases. As soon as this force becomes greater than the force of the spring 84 the valve element 82 will move outwardly in bore 80 to block passage 78 and bore 80 to prevent the exhaust of fluid from pump 50. Under these conditions the pump 50 becomes hydraulically locked with no relative movement between the pump gears. With the pump hydraulically locked the front cover 12 is drivingly connected to the turbine hub to provide a no-slip connection for high efficiency, steady state driving.

When the rotary speed of the input 12 and pump body 52 decreases to a point where the centrifugal force is less than the opposing force of spring 84 the spring will once again push the valve 82 to the stored position illustrated in the drawing to permit the pump to operate and pump fluid supplied through inlet 74 through outlet 78 and bore 80.

It will be appreciated that pump 50 is not related to other hydraulic controls and when valve 82 blocks exhaust bore 80, the pressure is dead headed to lock the converter.

Although preferred embodiments of the invention have been shown and described other embodiments will now be readily apparent to those skilled in the art. This invention is therefore not to be limited to the particular illustrations and descriptions but only by the following claims.

What is claimed is:

1. In a hydrodynamic unit having rotatable input and output rotor means rotatable about a longitudinal axis, a front cover for said unit providing an input operatively connected to said input rotor means, a torque transmitting hub, fastener means drivingly connecting said output rotor means to said hub, power transmitting means drivingly connected to said hub, clutch means for drivingly connecting said hub to said front cover to lock said hydrodynamic unit for unitary rotation, said clutch means comprising a base plate fixed to said cover and a locking plate disposed adjacent to said base plate having openings therein which are movable into drive engagement with said fastener means, coil spring means connected between said base plate and said locking plate for moving said locking plate from disengagement with said fastener means, cam means for moving said locking plate from a disengaged position to a clutching position into engagement with said fastener means, said cam means comprising a plurality of camming ramps each having a camming ball disposed therein each of which develops a centrifugal force of predetermined magnitude directed away from the axis of rotation of said base plate to move outwardly on said ramps to urge said locking plate axially into drive engagement with said fastener means to thereby lock said cover and said hub together for direct mechanical transmission of torque through said unit, and said spring means being operative to disengage said locking plate and said hub when said centrifugal force drops below the predetermined magnitude to thereby permit said unit to hydraulically operate.

2. In a hydrodynamic unit, bladed input rotor means and bladed output rotor means rotatable about an axis, rotatable housing means for said hydrodynamic unit drivingly connected to said input rotor means, said output rotor means having a central hub portion, locking means disposed in said hydrodynamic unit adjacent to said output rotor means for connecting and for disconnecting said input and output rotors, said locking means comprising a first locking member fastened to said housing means, a second locking member disposed between said first locking member and said central hub portion, connector means drivingly connecting said first and second locking members for rotation together and to allow said second member to be moved longitudinally with respect to said axis into and out of direct drive engagement with said hub portion of said output rotor means, centrifugally-operated actuator means disposed between said locking members for longitudinally moving said second locking member relative to said first member for locking and unlocking said input and output rotor means, inclined ramp means in one of said locking members for said actuator means, yieldable means operatively connecting said locking members for urging said locking means together and for exerting a force on said actuator means directed generally inwardly toward said axis of rotation, and said actuator means being movable to a position on said ramp means in response to a predetermined centrifugal force developed by said actuator means when said input rotor means reaches a predetermined input speed to effect the longitudinal movement of said second member into the drive engagement with said output rotor means to thereby cause the drive connection of said input and said output rotor means.

3. In a hydrodynamic unit having input and output rotor means rotatable about an axis, said unit having a front cover providing an input operatively connected to said input rotor means, a driven member, said output rotor means having a central hub portion drivingly connected to said driven member, clutch means disposed between said front cover and said output rotor means and directly engageable with said hub portion to drivingly connect said front cover and said driven member to lock said hydrodynamic unit for unitary rotation; said clutch means comprising a base plate fixed to said cover member, locking plate carried by said base plate, connector means mounting said locking plate for longitudinal movement along said axis of rotation, centrifugally actuated cam means disposed between said base plate and said locking plate, said cam means being movable between an inner position in which said locking plate is spaced from said hub portion and an outer position in which said locking plate is forced by said cam means into direct driving engagement with said hub portion, and spring means for yieldably holding said plates together and for positioning said cam means in said inner position and to oppose movement of said cam means toward said second position.

4. In a hydrodynamic unit having input and output rotor means rotatable about an axis, said input and output rotor means having bladed portions to form a torus for the circulation of fluid therein, a front cover for said unit providing an input operatively connected to said input rotor means, torque transmitting means, connecting means drivingly connecting said output rotor means to said torque transmitting means, lock-up clutch means disposed radially inwardly of said bladed portion of said output rotor means for drivingly connecting said front cover and said torque transmitting means to lock said hydrodynamic unit for unitary rotation and for subsequently unlocking said hydrodynamic unit to provide for the hydrodynamic transmission of torque therethrough, said clutch means comprising base plate means fixed to said front cover within said hydrodynamic unit, locking plate means disposed adjacent to said base plate, connector means supporting said locking plate for longitudinal movement with respect to said axis into and from drive engagement with said connecting means, ball means disposed between said base plate means and said locking plate means for moving said locking plate means into driving engagement with said output rotor means, spring means operatively connecting said locking plate means and said base means together and for urging said locking plate means toward said base plate means, and ramp means providing a track for each of said ball means so that each said ball means will be moved outwardly by centrifugal force from a low part of the associated ramp to a high part thereof to effect the direct drive engagement of said locking plate with said connecting means.

* * * * *